June 23, 1931.  W. H. ENDSLEY  1,811,686

DIRECT PULLING PIPE SPINNING WINCH

Filed Feb. 14, 1929

INVENTOR
William H. Endsley
BY Loyal J. Miller
ATTORNEY

Patented June 23, 1931

1,811,686

UNITED STATES PATENT OFFICE

WILLIAM H. ENDSLEY, OF MAUD, OKLAHOMA

DIRECT PULLING PIPE SPINNING WINCH

Application filed February 14, 1929. Serial No. 339,925.

My invention relates to winches for spinning pipes by direct pulling in connection with draw works as used in rotary drilling.

The principal objects of my invention are; to provide a device of this character which is entirely new, novel, practical, useful and of utility; to provide a winch operating on and operated by the line shaft of any standard draw works which will add to the safety of operation of said draw works as well as increase the speed of operation thereof; a clutch controlled winch which remains stationary until used and thus saves the burning out and wearing out of the rope; a device which does not require the breaking of the line, nor the putting on and taking off of the rope; a device which eliminates the disadvantage of the old method wherein the rope turns all of the time causing the said rope to wear out; a device in which a wire cable line can be used instead of a rope; a device so placed upon the line shaft as to be in an advantageous position for spinning the pipe and by virtue of its position being less dangerous; a device which is controlled by a brake operated by a helper and will thereby reduce by one man the number of men in the crew of the rotary drilling outfit.

Figure 4:
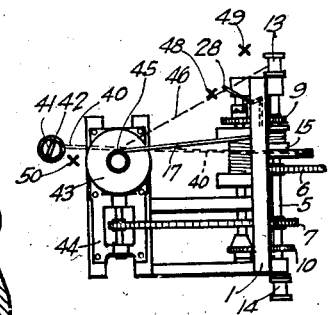

In the present method of spinning the pipe, power is taken off of the line shaft by taking several turns of a rope around the cat-head on one end of said shaft. A helper, by pulling on the free-end of this rope can, by the friction thus generated, cause the cat-head to spin the pipe. But the angularity of the application of this power due to the location of the cat-head with respect to the pipe causes indirect or side-wise pulling with consequent loss of power and also the friction and heat burns out and wears out the rope and entails much danger to workmen thereround. One man of the drilling crew, in order to reach the manipulating levers and engine throttle on the rotary draw works, is forced to stand under this swaying rope, thus endangering his safety. His station is in the logical position for reaching and operating the various controls, but the necessity of stooping to avoid the rope prevents him from seeing all that is going on around him. The man working under the present method, and standing as shown at $x$ numbered 49 in Fig. 4, must hold the free end of the rope wrapped around the cat-head. This is in continuous motion. The said rope frequently becomes entangled in the workman's clothing and draws him into the said cat-head causing injury and even death. Another workman is also required to stand as shown at $x$ numbered 48 of said Fig. 4. Frequently the rope breaks between the pipe and the cat-head and the broken end wraps around the arms, neck or body of one or the other of these two men to their injury or death. The breaking of the rope also endangers the man as shown at $x$ and numbered 50 as best shown in Fig. 4, standing at the table, but his position while dangerous is not so dangerous as the other two.

All of these disadvantages are obviated by my direct pulling pipe spinning winch. The end of the rope is rigidly anchored to the winch releasing the man as shown at 49 from holding the free end. The pull is direct, the rope is at one side and not over the head or shoulder of the driller as shown at 48; and there is no friction, heating, burning or wearing out of the rope. On the direct pulling plan such as I use in my invention the man as shown at $x$ and numbered 48 as best shown in Fig. 4, can safely stand there owing to the fact that the rope adjacent his shoulders has been moved. This also eliminates the necessity of a workman in the position as shown at $x$ and numbered 49 as best shown in Fig. 4.

Figure 1:
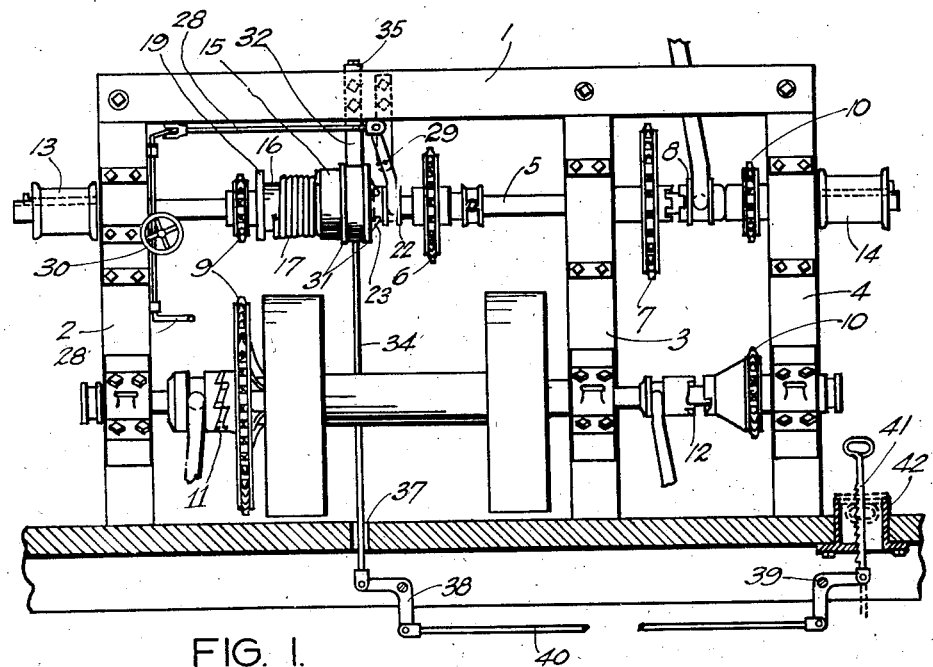
Figure 2:
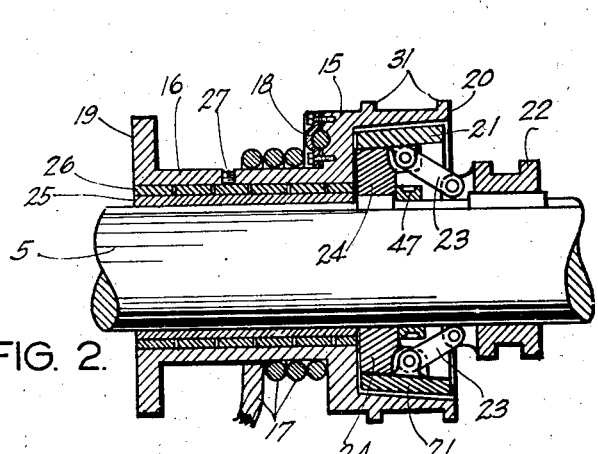
Figure 3:
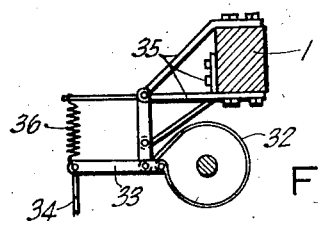

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is an elevational view of a rotary draw works; Fig. 2 is a sectional view of my winch; Fig. 3 is a side elevational view of the brake for my winch; and Fig. 4 is a plan view of a draw works in connection with a rotary.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes: In deep drilling with rotary outfits considerable time is consumed in connecting and disconnecting the long strings of drilling stems and pipes. Pipe wrenches are too slow but by wrapping a rope around the pipe in the proper direction and pulling on the rope the pipe is caused to spin around rapidly as desired. My direct pulling pipe spinning winch is installed as a part of any standard draw works, having a top cross frame 1, vertical posts 2, 3, and 4, line shaft 5 near the center of which is keyed drive sprocket 6 taking power from the drilling engine. Line shaft 5 also carries rotary drive sprocket 7 controlled by clutch 8, low speed sprocket 9 and high speed sprocket 10 for the drum shaft, the low speed being controlled by clutch 11 in Fig. 1 and the high speed by clutch 12. The cat-heads 13 and 14 are keyed to the ends of line shaft 5. My winch 15 is placed in position on line shaft 5 between drive sprocket 6 and low speed sprocket 9 as can best be seen in Figs. 1 and 4. As can be seen more in detail in Fig. 2 my winch 15 consists of the rope drum 16 around which is wound rope 17 which is anchored to said drum 16 by any usual means as at 18. One end of drum 16 is provided a plain flange 19, and this end of drum 16 abuts the hub of low speed sprocket 9. On the opposite end of said drum 16 the extended flange 20 forms a clutch drum for internal expansion friction clutch 21. I also provide clutch collar 22 keyed to line shaft 5, and a plurality of clutch fingers 23 pivotal with said collar and with a clutch spider, said clutch spider 24 being keyed to said shaft 5, and being positioned by set-collar 47. All of said members 20, 21, 22, 23 and 24 are operated in a manner usual with such standard devices. Drum 16 is provided with plain bushing 25 and oiling bushing 26 which receives a supply of oil under pressure through an oil hole closed by means of screw plug 27. Conveniently placed and securely attached to post 2 and frame 1 is clutch operating lever and connections 28 pivoted at 29 adjacent collar 22, said lever 28 being placed near engine throttle hand wheel 30. Exterior of extended flange 20 are brake flanges 31 for positioning brake band 32, controlled by brake lever 33 operated by brake rod 34, said members 32, 33 and 34 being attached to frame 1 and supported by members 35, said lever 33 being provided with a retrieving spring 36 all of which can best be seen in Figs. 2 and 3. Brake rod 34 passes through hole 37 in the drilling floor and by means of bell cranks 38 and 39 and bell crank connecting rod 40 terminates in operating ratchet hand lever 41 within supporting and guiding member 42 conveniently placed near rotary table 43 resting on base 44. A drilling helper can apply the brake band 32 by pulling up on lever 41 to the proper position by hand but said lever 41 and brake 32 can be released by foot or knee pressure against said lever 41. The driller stands near post 2 within reach of engine throttle 30 and clutch operating lever 28. When clutch 21 is released drum 16 is free to turn on shaft 5. The helper at the rotary table 43 unreels rope 17 from drum 16 and wraps said rope 17 around pipe 45 in the proper direction to spin said pipe 45. The driller throws in clutch 21 and power from continuously turning shaft 5 pulls rope 17 and instantly spins pipe 45. When said pipe 45 has been turned sufficiently the driller throws out the clutch and the helper reaches down and pulls up on lever 41, stopping drum 16 at once.

As can best be seen in Fig. 4, there is a direct pull on rope 17 and said rope 17 is to one side and out of the way of the driller when operated by my winch whereas when the rope is wrapped around cat-head 13 and takes power from said cat-head 13 the pull on said rope is at an unfavorable angle as indicated by dotted line 46 and the driller must duck under said rope to his inconvenience as well as danger. Cat-head 13 is not clutch controlled but is keyed to said shaft 5 and turns as long as shaft 5 turns. The rope around said cat-head 13 as used at the present time is constantly turned and is being constantly worn out even when not being used to spin pipe 45. This cannot take place with my winch 15. The necessity for the use of a helper for holding the free end of the rope wrapped around the cat-head is eliminated by my means 18 of securing said rope to my winch 15. There is no unnecessary wear on rope 17 as it remains stationary when not actually being wound up on spinning pipe 45.

Obviously, the invention is susceptible of embodiment in forms other than that which is illustrated in the accompanying drawings and described herein, and applicable for the uses and purposes other than as detailed, and I therefore consider as my own all such modifications and adaptations and other uses of the form of the device herein described as fairly fall within the scope of my invention.

Having thus described my invention what is claimed and desired to be secured by Letters Patent, is:

1. The combination with a standard draw works of a rotary well drilling outfit having a frame, said frame having two end posts and an intermediate post, a drum, a drum shaft carrying the same and supported on the posts, a line shaft supported on the posts, and means for driving said line shaft and said drum shaft, of a rope drum carried by said line shaft, means within said drum for operably connecting it to and disconnecting it from said line shaft, means for operating said connecting and disconnecting means from a point adjacent one of said end posts, a brake for said drum, and means for operating said brake from a point adjacent the other of said end posts.

2. The combination with a standard draw works of a rotary well drilling outfit having a frame, said frame having two end posts and an intermediate post, a drum, a drum shaft carrying the same and supported on the posts, a line shaft supported on the posts, and means for driving said line shaft and said drum shaft, of a rope drum carried by said line shaft substantially centrally thereon, clutch means within said drum for operably connecting it to and disconnecting it from said line shaft, means for operating said clutch means from a point adjacent one of said end posts, a brake drum integral with said rope drum, a brake band for said brake drum, and means for operating said brake band from a point adjacent the other of said end posts.

3. Organization as described in claim 2, in which said brake band operating means comprises, a rod passing through the floor supporting said draw works, a bell crank connecting the lower end of said rod to a laterally disposed rod, a second bell crank connecting the free end of said lateral rod to a vertical toothed link having a handle upon its upper end and extending upward through said floor adjacent one of said end posts, and means engaging the teeth on said link for retaining said link in a desired vertical position.

WILLIAM H. ENDSLEY.